United States Patent [19]
Gross et al.

[11] Patent Number: 5,406,578
[45] Date of Patent: Apr. 11, 1995

[54] UNSTABLE LASER RESONATOR FOR GENERATING A STABLE FUNDAMENTAL MODE BEAM PROFILE

[75] Inventors: Herbert Gross, Aalen; Harry Bauer, Aalen-Ebnat; Theo Lasser, Oberkochen; Martin Wiechmann, Aalen, all of Germany

[73] Assignee: Carl-Zeiss-Stiftung, Heidenheim, Germany

[21] Appl. No.: 93,553

[22] Filed: Jul. 19, 1993

[30] Foreign Application Priority Data

Aug. 6, 1992 [DE] Germany .................. 42 26 026.4
Jun. 4, 1993 [DE] Germany .................. 43 18 616.5

[51] Int. Cl.⁶ ........................................ H01S 3/11
[52] U.S. Cl. ........................................ 372/95; 372/10; 372/11; 372/29; 372/99; 372/107; 372/18
[58] Field of Search .............. 372/95, 98, 99, 106, 372/107, 10, 11, 29, 18

[56] References Cited

U.S. PATENT DOCUMENTS

| | | | |
|---|---|---|---|
| 4,156,209 | 5/1979 | Herbst et al. | 372/95 |
| 4,672,626 | 6/1987 | Koseki | 372/107 |
| 4,740,988 | 4/1988 | Knollenberg et al. | 372/99 |
| 4,777,639 | 10/1988 | Whitehouse | 372/107 |
| 4,837,769 | 6/1989 | Chandra et al. | 372/93 X |
| 4,918,704 | 4/1990 | Caprara et al. | 372/99 |
| 4,925,286 | 5/1990 | Cutburth | 372/107 X |
| 4,935,932 | 6/1990 | Johnson et al. | 372/33 |
| 4,942,588 | 7/1990 | Yasui et al. | 372/103 |
| 4,953,175 | 8/1990 | De Silvestri et al. | 372/95 |
| 5,022,043 | 6/1991 | Jacobs | 372/95 |
| 5,048,034 | 9/1991 | Tulip | 372/99 X |

OTHER PUBLICATIONS

"Stabilizing output with unstable resonators" by A. E. Siegmann, Laser Focus, May 1971, pp. 42 to 47.
"Passively Q-switched transversed-diode-pumped $Nd^{3+}$:YLF laser oscillator" by R. Beach et al, Optics Letters, vol. 17, No. 2, Jan. 15, 1992, pp. 124–126.
"Solid State Laser Engineering" by W. Köchner, 2nd edition, Springer Verlag, 1988, p. 166.

Primary Examiner—Rodney B. Bovernick
Assistant Examiner—Hemung Sanghavi
Attorney, Agent, or Firm—Walter Ottesen

[57] ABSTRACT

The reflecting surfaces within the resonator are minimized in an unstable laser resonator having a radially-dependent output end reflection profile and a passive Q-switch so that the least possible competing resonator geometries can be formed. For this purpose, a saturable absorber foil can be provided as a passive Q-switch element mounted so as to be inclined with respect to the optical axis. Furthermore, it is advantageous to use an output reflector having highly precise parallel boundary surfaces and to align this output reflector with high precision parallel to the end surfaces which delimit the laser medium.

19 Claims, 2 Drawing Sheets

UNSTABLE LASER RESONATOR FOR GENERATING A STABLE FUNDAMENTAL MODE BEAM PROFILE

BACKGROUND OF THE INVENTION

It has been known since approximately 1971 to use unstable resonator geometries to realize lasers which utilize a largest possible laser medium volume at the highest possible efficiency. In this connection, reference may be made to an article by A. E. Siegman entitled."-Stabilizing Output with Unstable Resonators", Laser Focus, May 1971, pages 42 to 47.

The article of R. Beach et al entitled "Passively Q-switched Transverse-Diode-Pumped $Nd^{3+}$:YLF Laser Oscillator", Optics Letters, Volume 17, No. 2, pages 124 to 126, suggests that a flat output reflector be used in a resonator of this kind in order to obtain a mode selection, that is, to drive the laser, for example, only in a fundamental mode. The output reflector has a radially-dependent reflection profile. A passive Q-switch is provided in the resonator with an LiF-color center crystal. The above arrangement is not ideal if the most compact laser configuration with a high overall efficiency and simultaneous mode selectivity is to be realized. The reason for this is that a plurality of reflecting surfaces is present within the resonator chamber which causes different competing secondary resonators having so-called parasitic modes to-be formed. The quality of the beam is disadvantageously affected thereby.

A similar resonator configuration is also disclosed in U.S. Pat. No. 4,918,704. An unstable laser resonator is likewise disclosed there which has an output reflector having a radially-dependent profile. A Q-switch is also provided. A longitudinal mode selection takes place by means of a second diode laser which, however, is not absolutely necessary for specific applications. The plurality of reflecting surfaces present in the resonator facilitates also the formation of different competing secondary resonators during laser operation.

A suppression of competing secondary resonators is achieved in a conventional manner by beveling the end faces of the solid-state rod at the Brewster angle or arranging the output reflector of the resonator at an angle such as in the text of W. Köchner entitled "Solid State Laser Engineering", second edition, Springer Verlag, 1988, page 166. The modes formed in the corresponding resonators are, however, often not completely suppressed by means of these measures. Secondary foci occur when focusing the laser beam. Secondary foci of this kind can often only be completely eliminated with an extremely inclined position which, however, has a negative influence of the desired mode image.

SUMMARY OF THE INVENTION

It is an object of the invention to provide a compact laser resonator which is configured as simply as possible and which guarantees a high efficiency as well as a stable transverse mode beam profile.

The unstable laser resonator of the invention is for generating a stable fundamental mode beam profile and includes: a laser medium defining an optical axis and having first and second end faces on the axis to delimit the laser medium therebetween; the second end face defining the output of the laser medium; radially-dependent reflection profile means disposed in the region of the output; end mirror means disposed adjacent the first end face; a Q-switch element interposed between the end mirror means and the second end face; the unstable laser resonator having a number of reflecting surfaces reduced to a minimum so as to cause as few competing component resonators to occur as possible; and, the first and second end faces being aligned parallel to each other with high precision whereby no disturbing additional modes form during operation of the laser resonator.

The number of reflecting surfaces is minimized in the resonator chamber of the unstable laser resonator of the invention in that as few as possible of such surfaces are available for the formation of competing secondary resonators. In this way, no disturbing modes can form during laser operation and no possible secondary foci are formed.

The unstable laser resonator according to the invention is characterized by a compact and very simple configuration. Furthermore, a stable fundamental mode operation is possible at the same time as a high overall efficiency in that the mode volume is almost completely utilized. A reduction in the structural length while at the same time maintaining specific capacity requirements is realizable. In this way, the configuration provided by the invention permits pulse widths in the range of a few ns to be realized.

A possible application of the laser resonator of the invention is in a solid-state laser for ophthalmology such as for membrane surgery of all kinds. However, a great many other areas of application are possible in which the above-mentioned requirements as to a compact laser or laser resonator are made.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
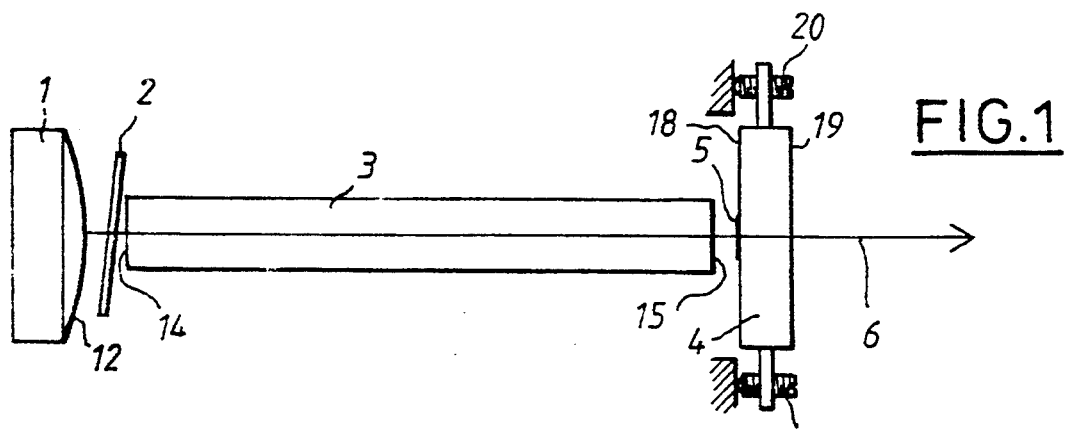
FIG. 1 is a first embodiment of an unstable laser resonator according to the invention having a separate output reflector.

A first embodiment of the unstable laser resonator of the invention is shown in FIG. 1. A solid-body rod 3 serves as the laser medium and can, for example, be a Nd:YAG rod which is excited via a flash lamp (not shown) and supplies a laser beam at a wavelength of 1.064 μm. The solid-state laser 3 and the flash lamp are mounted in an elliptical pump chamber made of zer quartz glass and mounted at the two ellipse focal points.

For increasing efficiency, this pump chamber is provided with a silver coating on the reflecting ellipsoid surface and a gold coating is applied to the end faces. In the embodiment shown, the actual unstable laser resonator comprises a convex end mirror 1 having a highly-reflective layer 12 for the laser wavelength with the layer 12 being on the convex surface facing toward the laser medium.

The output reflector 4 includes a glass carrier which has a side 18 facing toward the inner space of the resonator. The glass carrier is provided with a reflecting coating 5 on this side 18 which has a reflectivity which becomes less in the radial direction outwardly from the pass-through point of the optical axis 6. Details as to this reflection layer 5 are explained with respect to FIGS. 4a and 4b.

A saturable absorber foil 2 is provided as a passive Q-switch element and is arranged between the laser medium 3 and the highly-reflective coated end mirror 1. The absorber foil 2 is inclined with respect to the optical axis 6, that is, the absorber foil is at an angle with respect to the optical axis 6 which is unequal to 90°. The arrangement of the absorber foil 2 must be such that no competing secondary resonators can form between the absorber foil 2 and the other reflecting resonator surfaces. An EASTMAN KODAK Q-switch acetate sheet can be used, for example, in combination with a Nd:YAG rod. This Q-switch acetate sheet has an extremely low optical density of approximately 0.3 to 0.4. If the particular absorber foil 2 is mounted at an angle of 45° to the resonator axis 6 then the defined polarized radiation of the laser results in the embodiment shown. This can be advantageously utilized for the measurement of energy of the emitted laser radiation. The residual transmitted beam component can be used for measuring energy in dielectrically coated folding mirrors. No special coating on the folding mirror is required in a laser having a defined polarized direction. This special coating otherwise would guarantee that the transmitted beam component is the same for all statically possible polarization directions. The defined polarization of the laser can likewise advantageously be utilized with an unstable laser resonator of the invention for attenuating the radiation.

Competing modes in secondary resonators leave the resonator at slightly different angles. The occurrence of these competing modes is prevented by mounting the absorber foil 2 at an angle as well as orientating the boundary surfaces (18, 19) of the output reflector 4 and the end surfaces (14, 15) of the laser medium parallel to each other with high precision. The laser medium here is the solid-state rod 3.

The glass carrier of the output reflector 4 has a parallelism of the limiting surfaces (18, 19) of less than 10 arc seconds as do the boundary surfaces (14, 15) of the solid-state rod 3; that is, the angle which the respective surfaces conjointly define is less than 10 arc seconds.

The output reflector 4 is furthermore movably mounted such that, with the aid of adjusting elements 20, a precisely parallel alignment of the boundary surfaces (18, 19) of the output reflector 4 to the end faces (14, 15) of the solid-state rod 3 is possible. In this way, an exact parallel alignment of the output reflector 4 to the end faces (14, 15) of the solid-state rod 3 is obtained. The movable arrangement of the output reflector 4 and the adjusting elements 20 corresponding thereto are shown only schematically in FIG. 1. For this purpose, the most varied bearing arrangements are possible which make possible a parallel alignment. For example, the output reflector 4 can be journalled so as to be movable about three axes mutually perpendicular to each other. In an embodiment which is less complex, it is possible to mount the output reflector in an end plate and to mount the solid-state rod in the base body of the laser. These two parts can be adjustable and fixable with respect to each other within an adjustment range permitted by the adjusting screws.

The highly exact parallel dimensioning of the solid-state laser end faces (14, 15), the boundary faces (18, 19) of the output reflector 4, the precise parallel alignment of the solid-state rod end faces (14, 15) and the boundary surfaces (18, 19) of the output reflector by means of the adjusting elements 20 as well as the inclined positioning of the absorber foil 2 in the resonator chamber guarantee the reliable suppression of the competing secondary resonators and the suppression of modes which leave the resonator at different angles. A homogeneous beam profile during laser operation results without disturbing secondary foci and with a simple focusing of the laser beam.

With the aid of the unstable laser resonator of the invention, laser pulse widths tp in the range $tp < 3$ ns can be realized simultaneously with a high efficiency provided the passive Q-switch, the radially-dependent reflection profile 5 as well as the structural length and the radius of curvature of the end mirror 1 are optimally matched to each other.

Figure 2:
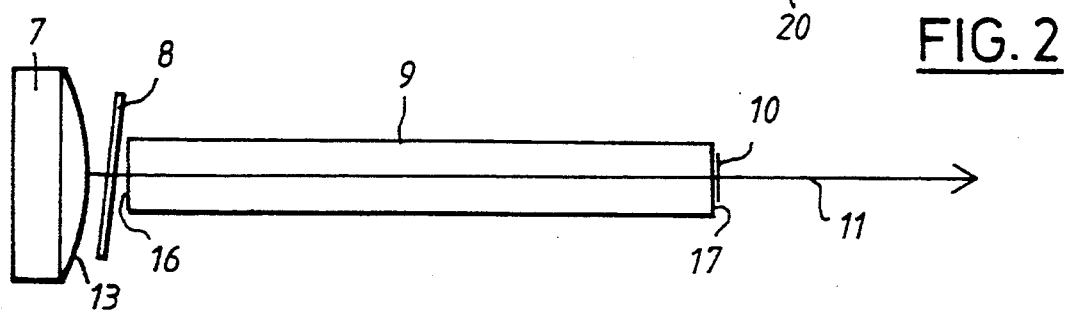
FIG. 2 is a schematic of a second embodiment of the unstable laser resonator of the invention having an output reflector mounted on the solid-state rod.

A second embodiment of the unstable laser resonator of the invention is shown in FIG. 2. A solid-state rod 9 again serves as the laser medium and can, for example, be a Nd:YAG rod. The end mirror 7 likewise has a convex form in this embodiment and has a highly-reflecting coating 13 for the laser wavelength 1.064 μm. A saturable absorber foil 8, that is, a passive Q-switch element, is mounted between the solid-state rod 9 and the end mirror 7 and is inclined with respect to the optical axis 11.

In contrast to the first embodiment of FIG. 1, no separate element as the output reflector is provided in this embodiment. Instead, the radially-dependent reflection layer 10 is applied directly to the output end face 17 of the solid-state rod 9. In this embodiment too, the guarantee can be provided that no competing secondary resonators are formed but that instead the resonator supplies a stable fundamental mode beam profile by means of the inclined arrangement of the absorber foil 8 in the resonator as well as by means of the highly precise parallel dimensioning of the end faces (16, 17) of the solid-state rod 9. This embodiment supplies a further reduction of separate elements in the resonator chamber and therefore a compact configuration.

A further alternate embodiment of the unstable laser resonator is provided by utilizing specific crystal materials as passive Q-switch elements in lieu of the absorber foil. Such crystal materials include $Cr^{4+}$:YAG, $LiF(F_2^-)$ or $Cr^{4+}$:GSGG. Crystal materials of this kind in the form of a thin crystal layer (approximately 1 mm thick) can be mounted as a separate element in the resonator chamber in the same way as the absorber foil in the embodiments described above.

The crystal layer is preferably anti-reflection coated for the particular laser wavelength for suppressing competing secondary resonators. In this way, reflection losses in the resonator chamber are avoided and reflections at the crystal boundary surfaces are suppressed. Alternatively, the crystal layer can also be used in an embodiment in which the crystal layer is not anti-reflection coated by mounting this layer in the resonator chamber so that it defines an angle with respect to the optical axis which is close to the Brewster angle in order to thereby realize a polarized oscillation build-up of the laser.

Figure 3:
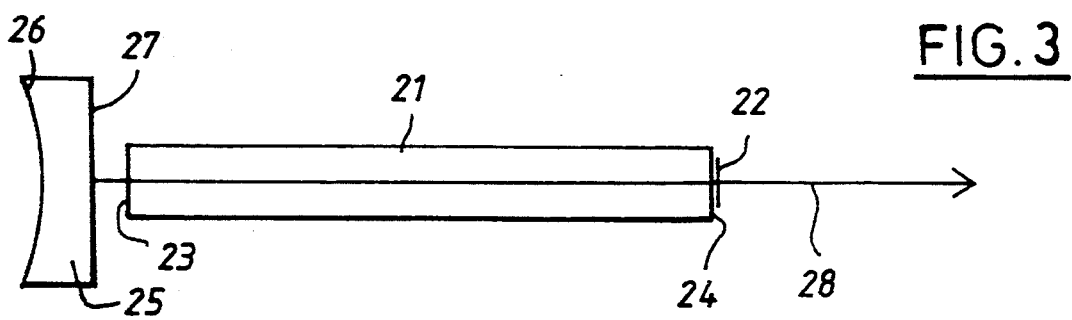
FIG. 3 is a third embodiment of the unstable laser resonator of the invention with a Q-switch crystal integrated into the end mirror.
Figure 4:
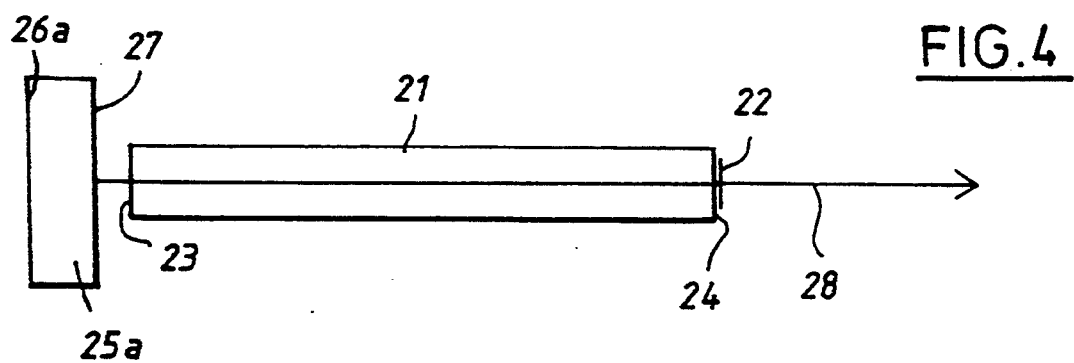
FIG. 4 is a fourth embodiment of the unstable laser resonator of the invention also with a Q-switch crystal integrated into the end mirror; and, FIGS. 4a and 4b show suitable output end reflection profiles.

A further simplification of the resonator configuration is possible by utilizing such crystal materials in that the highly-reflecting resonator end mirror and the particular Q-switch crystal can be integrated into a single element. A corresponding embodiment is shown in FIG. 3. The embodiment of FIG. 3 includes the solid-state rod 21 (for example, a Nd:YAG rod having the radially-dependent reflection profile 22 arranged at the output end thereof and the highly precise parallel end faces (23, 24) of the solid-state rod 21. In addition to these elements and as described in the above embodiments, the resonator includes only the highly-reflecting end mirror 25 which is integrated into a single element with the Q-switch crystal as the carrier substrate. The Q-switch crystal has a surface 26 operating as the laser end mirror which surface 26 is highly reflectant in the direction of the laser medium for the particular wavelength, and the Q-switch crystal also has a surface 27 designed to be anti-reflectant for this wavelength. In the embodiment of FIG. 4, the boundary surfaces (26a, 27) of the Q-switch crystal defined by the end mirror 25a are as precisely parallel to each other as possible as well as being parallel to the end face 23 of the solid-state rod 21 used.

It is also possible to arrange an immersion liquid between the end surfaces of the solid-state rod 21 and the Q-switch crystal having the surface 26 acting as an end mirror in order to suppress undesired reflections at the different boundary surfaces.

Figure 4A:
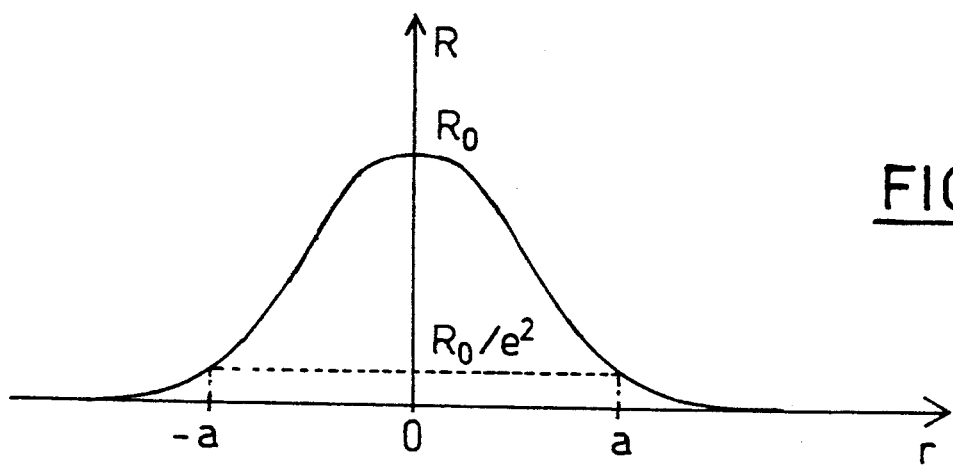
Figure 4B:
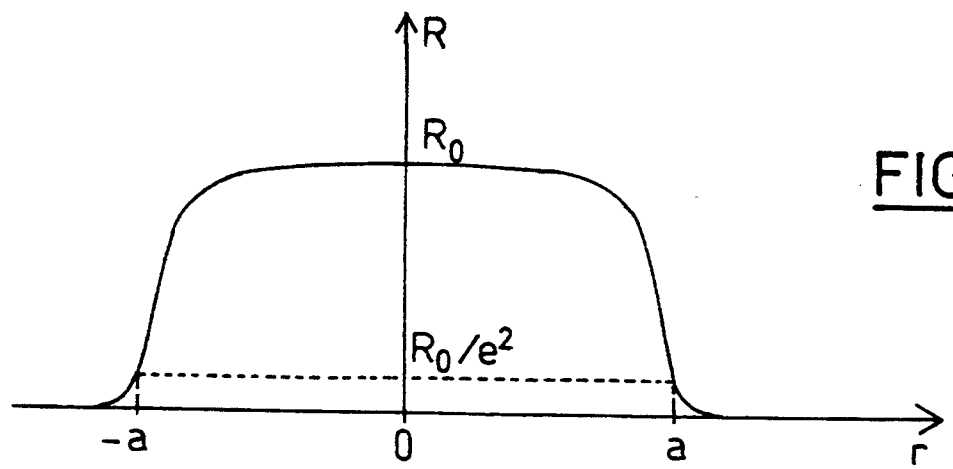

Suitable outcoupling-end reflection profiles which have a radial dependency are described with respect to FIGS. 4a and 4b. These figures each show the reflectivity R plotted as a function of the radial coordinate r with the center point of this coordinate being in the optical axis or in the center point of the beam. So-called Gauss reflection profiles are shown in FIGS. 4a and 4b which can be described analytically approximately as follows:

$$R(r) = R_0 * \exp(-2 * (r/a)^m)$$

wherein $R_0$ is the maximum value of the reflection and the parameter m determines the particular flank slope. In FIG. 4a, m=2, that is, a simple Gauss profile is present. For FIG. 4b, m>2 and this case can be characterized as a super Gauss profile. Suitable values of m lie approximately between 2 and 5.

In FIGS. 4a and 4b, (a) characterizes the particular radius at which the maximum reflectivity $R_0$ has dropped to $R_0/e^2$. The parameter (a) for a laser rod diameter of 4 mm is selected preferably in the order of magnitude of between 0.9 mm and 1.6 mm. Suitable maximum reflectivities $R_0$ lie approximately between 25% to 45%. Together with a suitably selected radius of curvature of the highly-reflecting end mirror, unwanted higher modes can be well discriminated.

The particular reflection layer is a layer of one or more thin $\lambda/4$-layers which are vaporized through a diaphragm having a diameter of 1.5a onto a substrate. The $\lambda$ identifies the particular laser wavelength. For example, $Ta_2O_5$ serves as a suitable material for reflection layers of this kind having an adequately high destruction threshold. A specific radial dependency of the reflection profile can be realized by the defined variation of the spacing between diaphragm and the particular substrate.

It is understood that the foregoing description is that of the preferred embodiments of the invention and that various changes and modifications may be made thereto without departing from the spirit and scope of the invention as defined in the appended claims.

What is claimed is:

1. An unstable laser resonator for generating a stable fundamental mode beam profile, the unstable laser resonator comprising:

a laser medium defining an optical axis and having first and second end faces on said axis to delimit said laser medium therebetween;

said second end face defining the output of said laser medium;

radially-dependent reflection profile means disposed in the region of said output;

end mirror means disposed adjacent said first end face;

a passive Q-switch layer element interposed between said end mirror means and said second end face and being mounted on said axis at an angle other than 90° with respect thereto;

said first and second end faces being aligned parallel to each other with high precision whereby no disturbing additional modes form during operation of the laser resonator;

said reflection profile means including planar reflective surface means mounted on said axis adjacent said second end face;

said planar reflective surface means defining a single planar reflection surface parallel to said second end face; and, said radially-dependent reflection profile means defining a reflectivity in said planar reflection surface which is a maximum on said optical axis and which becomes decreasingly less as a function of radial distance from said optical axis.

2. The unstable laser resonator of claim 1, said reflective profile means comprising an output reflector disposed on said axis in spaced relationship to said second end face; and, said output reflector defining boundary surfaces aligned parallel to each other and to said second end face; and, said reflection surface means being a reflective layer formed on one of said boundary surfaces at said axis.

3. The unstable laser resonator of claim 2, said passive Q-switch layer element being mounted in said resonator on said axis at a defined angle with respect thereto so as to effect a build-up of polarized oscillations of said resonator.

4. The unstable laser resonator of claim 1, said reflection profile means having a reflectivity R which can be described analytically as follows:

$$R(r) = R_0 * \exp(-2 * (r/a)^m)$$

wherein: r is the radial coordinate,
$R_0$ is the maximum mean reflectivity lying in the range of 25% to 45%, and
a and m are pregiven parameters with a lying in the range of 0.9 mm to 1.6 mm and m lying in the range of 2 to 5.

5. The unstable laser resonator of claim 4 said reflection profile means being defined by a thin $Ta_2O_5$ layer.

6. The unstable laser resonator of claim 5, said $Ta_2O_5$ layer being a $\lambda/4$-thick layer where $\lambda$ is the wavelength of the laser.

7. The unstable laser resonator of claim 1, said resonator defining a resonator chamber; and, said laser medium being a Nd:YAG rod having said first and second end faces and being disposed in said resonator chamber.

8. The unstable laser resonator of claim 1, said passive Q-switch layer element being a saturable absorber foil arranged on said axis.

9. The unstable laser resonator of claim 8, further comprising a planar output reflector having exactly parallel boundary surfaces arranged on said axis adjacent said second end face; one of said boundary surfaces facing toward said second end face; and, said radially-dependent reflection profile means being applied to said one boundary surface.

10. The unstable laser resonator of claim 9, said output reflector being mounted so as to be movable and said resonator further comprising adjusting means for movably adjusting said output reflector so as to precisely align said boundary surfaces thereof parallel to said end faces of said laser medium.

11. The unstable laser resonator of claim 8, said laser medium being a solid-body rod having said first and second end faces as very precise parallel end faces; and, said planar reflective surface means being mounted on said second end face.

12. The unstable laser resonator of claim 1, said passive Q-switch layer element being a thin crystal layer arranged on said axis.

13. The unstable laser resonator of claim 1, said Q-switch element and said end mirror means being integrated into a single element.

14. An unstable laser resonator for generating a stable fundamental mode beam profile at a predetermined wavelength, the unstable laser resonator comprising:

a laser medium defining an optical axis and having first and second end faces on said axis to delimit said laser medium therebetween;

said second end face defining the output of said laser medium;

radially-dependent reflection profile means disposed in the region of said output for defining a planar reflection surface parallel to said second end face and perpendicular to said optical axis;

said radially-dependent reflection profile means further defining a reflectivity in said planar reflection surface which is a maximum on said optical axis and which becomes decreasingly less as a function of radial distance from said optical axis;

said first and second end faces being aligned parallel to each other with high precision whereby no disturbing additional modes form during operation of the laser resonator;

a carrier substrate having first and second substrate surfaces transverse to said axis and being made of crystal material defining a passive Q-switch;

said first substrate surface being formed on a side of said substrate facing away from said first end face and defining a reflective surface facing toward said first end face; and, said second substrate surface being formed as an anti-reflectant surface for said wavelength.

15. The unstable laser resonator of claim 14, said first and second substrate surfaces being mutually parallel and parallel to said first end face.

16. The unstable laser resonator of claim 14, said first substrate surface being a curved surface and said second substrate surface being a planar surface parallel to said end face.

17. The unstable laser resonator of claim 14, said crystal material being $CR^{4+}$:YAG.

18. The unstable laser resonator of claim 14, said crystal material being LiF ($F_2^-$).

19. The unstable laser resonator of claim 14, said crystal material being $Cr^{4+}$:GSGG.

* * * * *